Oct. 14, 1969 G. DEARSLEY 3,472,236
CIGARETTE OR CIGAR MAKING MACHINE AND METHOD
Original Filed March 8, 1962 7 Sheets-Sheet 3

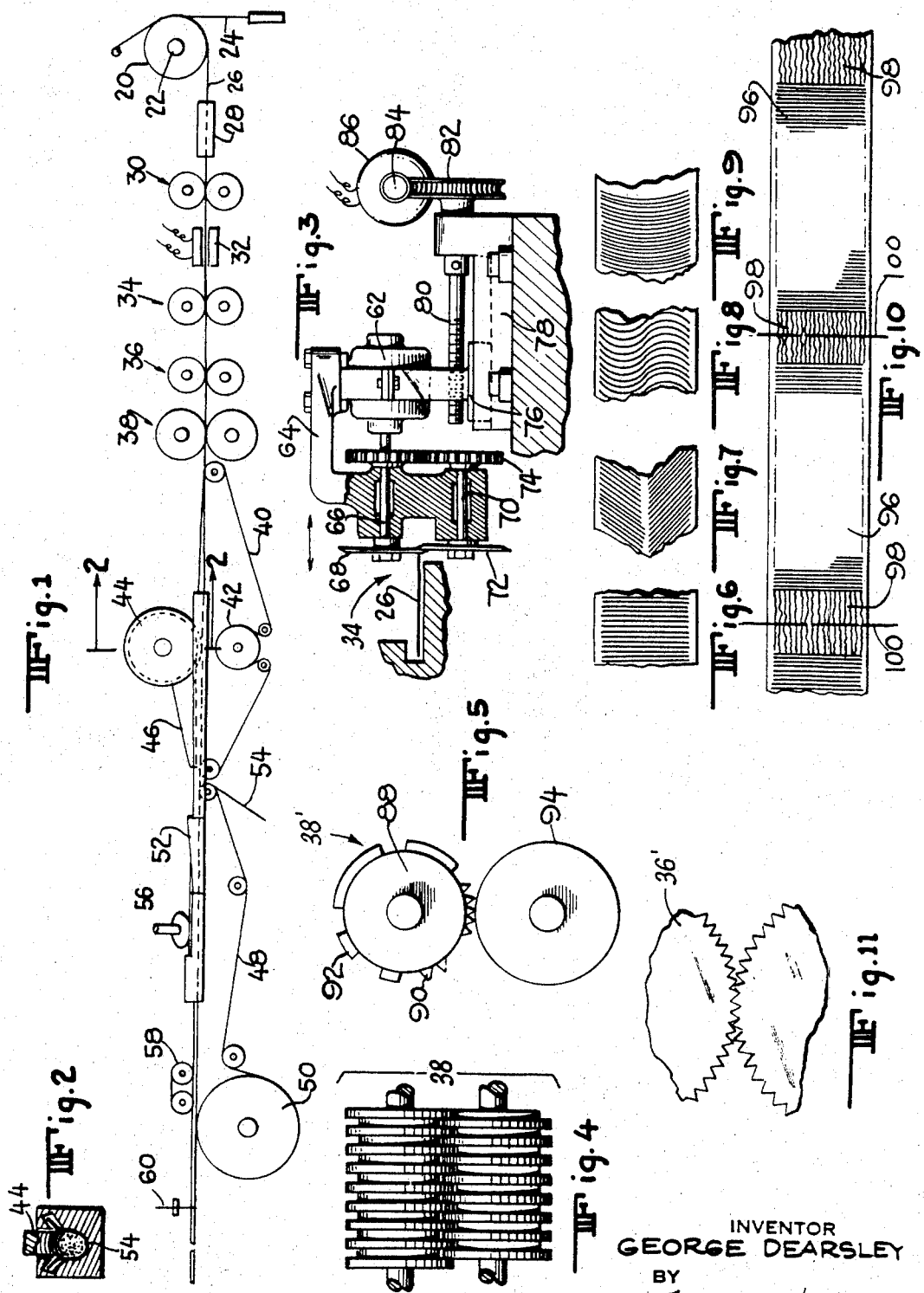

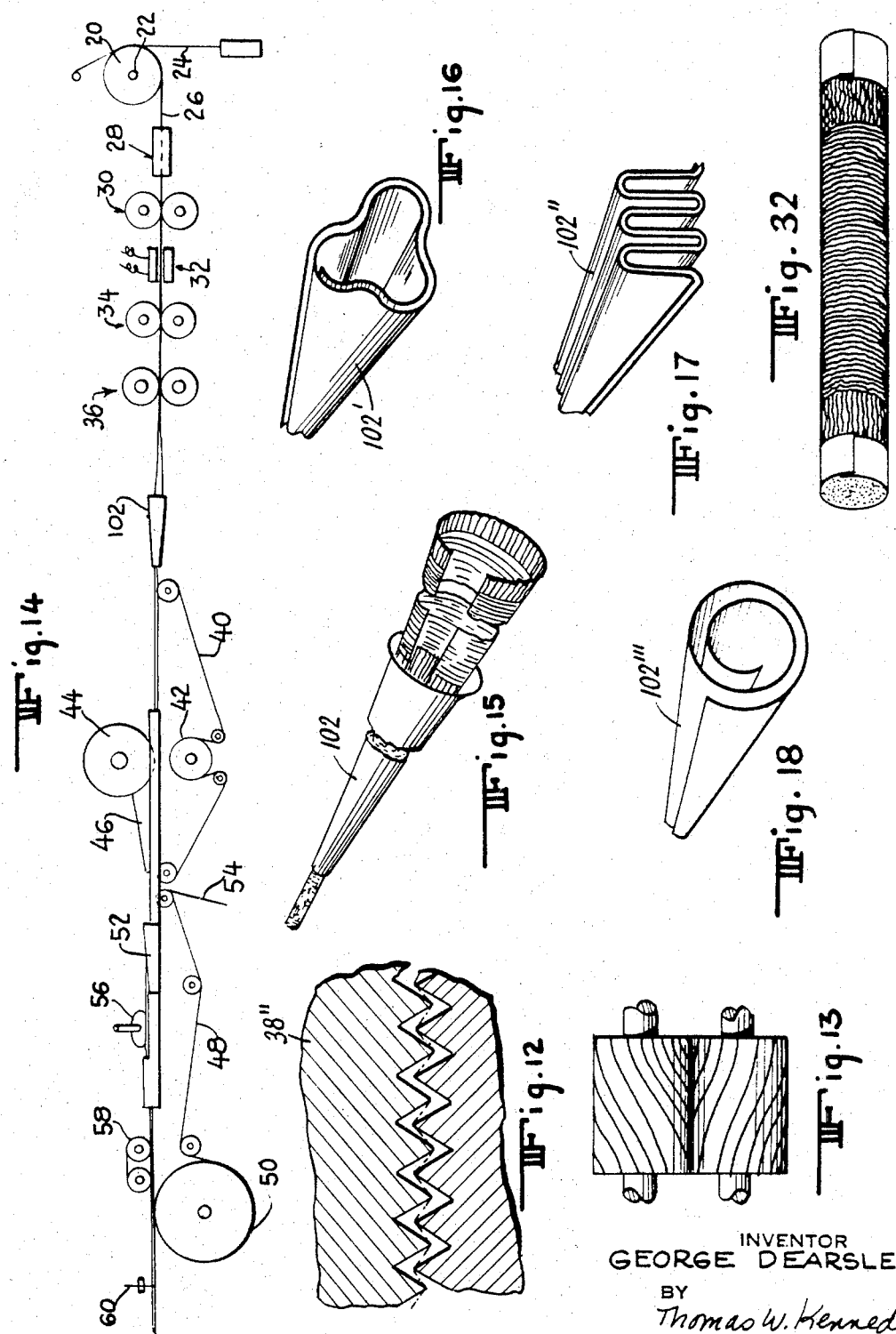

INVENTOR
GEORGE DEARSLEY
BY
Thomas W. Kennedy
ATTORNEY

INVENTOR
GEORGE DEARSLEY
BY
Thomas W. Kennedy
ATTORNEY

Oct. 14, 1969 G. DEARSLEY 3,472,236
CIGARETTE OR CIGAR MAKING MACHINE AND METHOD
Original Filed March 8, 1962 7 Sheets-Sheet 5
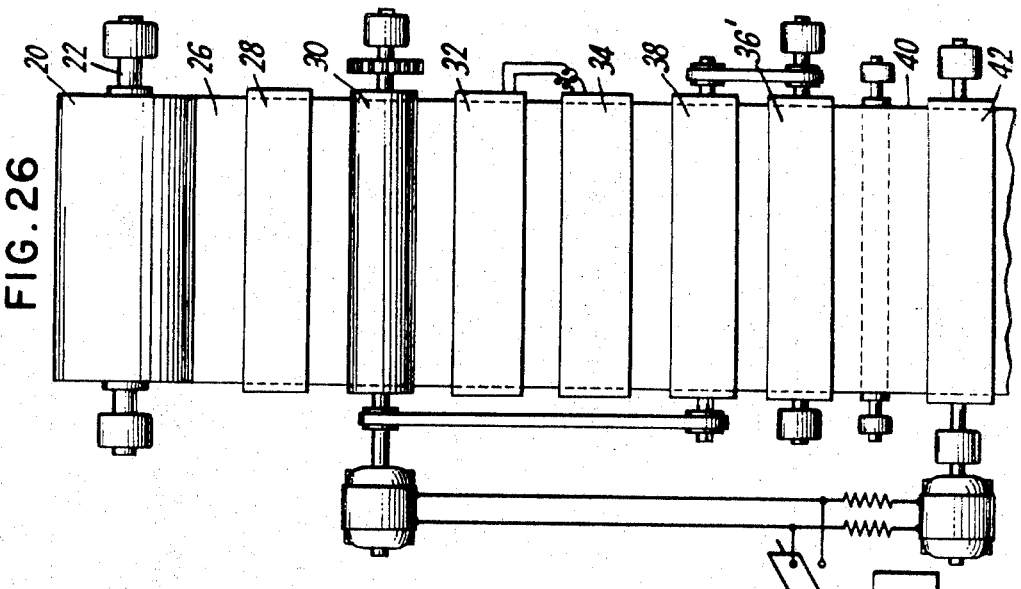
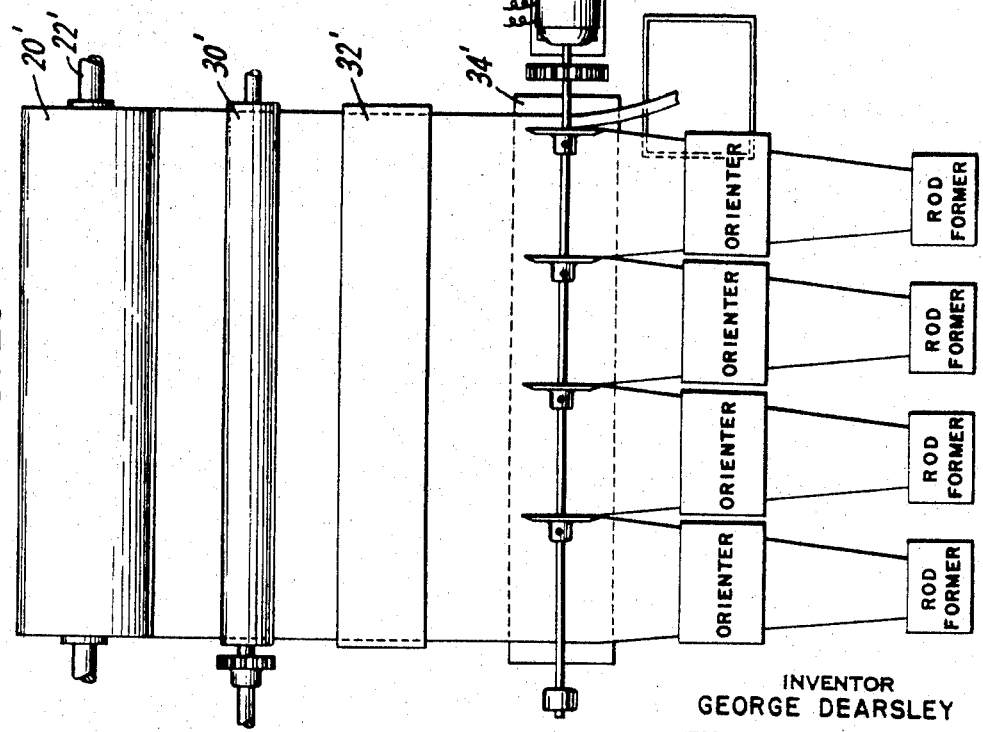
INVENTOR
GEORGE DEARSLEY
BY
Thomas W. Kennedy
ATTORNEY Oct. 14, 1969  G. DEARSLEY  3,472,236
CIGARETTE OR CIGAR MAKING MACHINE AND METHOD
Original Filed March 8, 1962  7 Sheets-Sheet 6

INVENTOR
GEORGE DEARSLEY
BY
Thomas W. Kennedy
ATTORNEY

Oct. 14, 1969            G. DEARSLEY            3,472,236

CIGARETTE OR CIGAR MAKING MACHINE AND METHOD

Original Filed March 8, 1962            7 Sheets-Sheet 7

*INVENTOR.*
GEORGE DEARSLEY

BY

*Thomas W. Kennedy*
ATTORNEY

United States Patent Office 3,472,236
Patented Oct. 14, 1969

3,472,236
**CIGARETTE OR CIGAR MAKING MACHINE
AND METHOD**
George Dearsley, Richmond, Va., assignor to American
Machine & Foundry Company, a corporation of New
Jersey
Application Nov. 16, 1964, Ser. No. 411,255, now Patent
No. 3,299,895, dated Jan. 24, 1967, which is a division
of application Ser. No. 179,288, Mar. 8, 1962, now
Patent No. 3,230,958, dated Jan. 25, 1966, which in
turn is a continuation-in-part of application Ser. No.
31,858, May 26, 1960. Divided and this application
May 23, 1966, Ser. No. 594,287
Int. Cl. A24c 5/28, 1/26
U.S. Cl. 131—20                                     11 Claims

ABSTRACT OF THE DISCLOSURE

The manufacture of smoking articles from reconstituted tobacco in which the tobacco is supplied as an endless sheet, worked transversely of its length and formed continuously into a rod, wrapped and cut into desired cigarette or cigar lengths. The working is accomplished by cutting the sheet into a multiplicity of strands, the cutting being discontinuous to ensure that the web remains coherent. The rod has a uniform mass per unit length.

---

This application is a division of application Ser. No. 411,255 filed by me on Nov. 16, 1964, now U.S. Patent No. 3,299,895, and which is a division of application Ser. No. 179,288 filed by me on Mar. 8, 1962, now U.S. Patent No. 3,230,958, which was itself a continuation-in-part of application Ser. No. 31,858 filed by me on May 26, 1960 and now abandoned, for Cigarette or Cigar Making Machine and Method, and claim is made to all of the equitable and legal benefits derivable therefrom.

This invention relates to cigarette or cigar making machinery and more particularly to a method and means for making cigarettes or cigars from reconstituted or homogenized tobacco.

Currently, cigarettes are made from shredded tobacco which is usually prepared from a blend of a number of varieties of tobacco leaves from which the coarse middle rib or "stem" has been removed. The operations of removing the "stem" and the mixing the various tobacco varieties cannot be carried out without undesirable breakage of the tobacco which results in small pieces and dust, which are in many ways undesirable in the finished cigarette or cigar.

The action of cutting the tobacco leaf into shreds produces further short strands in addition to the breakage which must occur in the handling of any weak strands. The random shape of the leaf pieces before cutting also inevitably results in short pieces being produced from the small corners of larger sheets.

The feeding of the required quantity of shredded tobacco to form an endless uniform stream of tobacco such as is generally employed in the cigarette making process poses formidable problems and the equipment used has become progressively more elaborate and costly. Here again, the separating of the endless stream of tobacco from the bulk mass results in further breakage so that the overall process produces a quantity of small tobacco particles and dust which, while it may be of excellent quality as tobacco, is in an unsuitable form for cigarette or cigar manufacture.

Within recent years inventors have been stimulated to search for means whereby tobacco dust and small particles may be upgraded, thus realizing considerable economies in the manufacturing process. The most successful of these efforts has resulted in the production of a tobacco sheet which, in the case of cigarettes, is employed in the same way as leaf tobacco; that is, it is cut to leaf-sized sheets, mixed with natural leaf and cut into shreds which are formed into cigarettes, employing the existing complicated and costly tobacco feeding apparatus.

It is an object of this invention to provide an improved method of producing cigarettes or cigars from reconstituted or homogenized tobacco sheet.

Another object of this invention is to provide a method of making cigarettes or cigars from a continuous strip of reconstituted or homogenized tobacco, in such a way that currently employed complex tobacco feeding machinery is unnecessary and a simplified rod forming mechanism can be used in place thereof.

Another object of this invention is to shred the tobacco while it is travelling toward, and immediately before it enters the rod forming mechanism.

Another object is to provide means whereby the strands of tobacco may be arranged in the desired configuration within the cigarette.

Another object is to control the weight of the finished cigarettes by controlling the width of the web of reconstituted tobacco sheet travelling towards the cigarette.

Another object is to produce a cigarette or cigar from one or more continuous webs of indefinite length composed of reconstituted tobacco without shredding the web.

Another object is to control the configuration of the pleats and crimples formed in a web or webs of reconstituted tobacco of continuous indefinite length when they are employed as the unshredded filler of a cigarette or cigar.

Other objects of the invention will become apparent upon reading the following specification and referring to the accompanying drawings which form a material part of this disclosure.

The invention accordingly consists in the features of construction and combinations and arrangements of elements and method steps which will be exemplified in the construction heretofore described and of which the scope will be indicated by the appended claims.

FIG. 1 is a front elevational view of one embodiment of the invention as employed for producing shredded tobacco cigarettes in association with the cooperating elements of a conventional cigarette making machine.

FIG. 2 is an end elevation along line 2—2 of FIG. 1 showing how the tobacco stream is formed into a circular cross-section.

FIG. 3 shows the apparatus employed to trim the edge of the tobacco sheet in response to the signal received from the mass measuring gauge.

FIG. 4 shows apparatus for slitting the tobacco web.

FIG. 5 shows alternative apparatus for slitting the tobacco web.

FIGS. 6, 7, 8, 9 and 10 show some variations in patterns for slitting the tobacco web into shreds.

FIG. 11 shows rollers employed for crimping the web or strands of tobacco.

FIG. 12 shows rollers employed for providing incipient tears and slits in a web of tobacco.

FIG. 13 shows one form of alternative roller for treating the tobacco web.

FIG. 14 is a front elevation of one embodiment of the invention as employed for producing cigarettes or cigars filled with unshredded tobacco, including the co-operating elements of a conventional cigarette machine.

FIGS. 15, 16, 17 and 18 show three of many possible configurations of apparatus employed for producing controlled lateral crumpling of the tobacco web.

FIG. 25 shows an arrangement for pulling a tobacco web fro ma source of supply, a sense to determine the mass of the web, a web edge trimmer responsive to the senser, to provide a uniform mass per unit length, a web slitter to slit the web into strands, and a strand orienter to orient the strands prior to forming the rod.

FIG. 26 shows an arrangement for feeding tobacco web from a source of supply, trimming the web to form a continuous strip of substantially constant mass per unit length, shredding the web, crimping the shreds and removing the crimped tobacco at a slower rate than the reconstituted tobacco is fed from the source.

FIG. 32 is a perspective view of the finished article with the wrapper broken away to show the filler.

Figure 19:
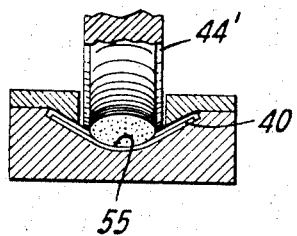
FIG. 19 shows a rod former for oval cigarettes.

In an effort to overcome the problems of excess labor, material waste, and to create uniformity of the finished product, the homogenized tobacco sheet, also known as reconstituted or reconstructed tobacco was developed. This material is a more uniform blend of the tobacco than can possibly be obtained by conventional methods of physical mixing in leaf form of different tobacco types. The uniformity is made possible by the process of grinding the basic tobacco ingredient to a powder fine consistency, and thoroughly mixing them prior to forming a sheet of a specified thickness. Such a process leaves freedom to reprocess or rework all scrap and machine loss to basic specification.

U.S. Patent 2,769,734 granted Nov. 6, 1956, to David Bandel, and U.S. Patent 2,734,510 granted Feb. 14, 1956, to Gordon P. Hungerford and Delbert F. Jurgensen Jr. described and illustrate methods and apparatus for making reconstructed tobacco sheets in this manner. Any other suitable method or apparatus for making sheet tobacco or smoking material could be used equally as well with my present invention.

To make cigarettes, it has been the practice to shred this tobacco sheet in just the same manner as tobacco leaves have been shredded in the past, and then by different showering and metering techniques to form an endless stream or rope of shredded tobacco.

In spite of the complexity of the apparatus employed in the past to form this stream from a bulk mass of tobacco, the end result is far from uniform.

In order to solve this problem, I conceived and devised the present invention which enables one to obtain and more readily maintain a constantly uniform filler in a cigarette made up of shredded tobacco without using the complex feeding mechanism which was hitherto necessary and which alternatively provides means whereby a cigarette-like article may be produced from a crumpled web of unshredded tobacco.

Homogenized, reconstituted, or reconstructed tobacco is usually manufactured in sheets from 4 to 8 feet in width, the thickness of the sheet usually being approximately that of a tobacco plant leaf. This sheet may be wound into rolls and may then be handled by orthodox paper converting techniques. For purposes of this invention, the original rolls are slit and rewound into bobbins of tobacco sheet of a width which have a mass per unit length substantially equal to the mass per unit length of the cigarette article to be produced. If more than one web is to be employed to form the cigarette, then the webs will be slit so that their total mass per unit length is substantially equal to the mass per unit length of the cigarettes to be produced.

It is these bobbins of tobacco sheet which are mounted on the cigarette making machine to supply a continuous indefinite length of web or webs of tobacco which is processed to form an endless cigarette rod of the desired characteristics.

The adavntages of this will be obvious. If the tobacco sheets of uniform thickness, the mass per unit length of the cigarette produced may be determined solely by controlling the width of the slit bobbins of tobacco. The simple slitting machinery performs the same function as the elaborate and costly tobacco feed universally employed at present.

Also, the wound bobbin of tobacco is very dense; thus the storage and transport of tobacco to the making machine is much facilitated by the convenient form and size of tobacco bulk which must be supplied to the machine.

However, in practice, it is found that the mass per unit area of the tobacco sheet cannot be kept precisely uniform. Under some conditions and for certain classes of cigarettes this may be of no consequence, for the accuracy obtained is such that an excellent smoking article is still produced.

Under other conditions, the maximum possible uniformity is desirable, in which case the slit web is made of such a width that its mass per unit length is never less than the mass per unit length of the desired finished cigarette. This overweight web is then passed through a mass sensing device which controls a second device which removes material from the web in proportion to the signal received, producing a web which has a variable area per unit length but which has a constant mass per unit length by reason of the variable thickness.

This correcting operation may be performed in conjunction with the slitting operation before the bobbin is re-wound or it may be performed on the cigarette making machine itself when the bobbin is finally unwound for processing into the finished article.

The mass sensing devices may be of any suitable type, for example, dielectric or radiation detecting type gauges have been employed. Such devices are shown and described in the articles, Radioactive Thickness Gage for Moving Materials by J. R. Carlin, published in Electronics, October, 1949, and Beta Ray Thickness Gage, published in Electronics, October 1947, and in U.S. patent to W. E. Shoupp et al. No. 2,264,725, granted Dec. 2, 1941. Any other suitable sensing technique could, of course, be employed, the important factor being that the detecting device determines the mass per unit area of the material passing through the gauging station.

Various methods of making cigarettes or cigars according to the invention will now be described.

Referring to FIG. 1, 20 represents the bobbin of tobacco sheet which is mounted on a spindle 22 and is provided with a conventional brake band 24. The web of tobacco 26 is passed through a guiding device 28, which controls its lateral position and through a pair of pulling rollers 30 which grip the web 26 and unwind it from the bobbin 20 at the required rate. The mass sensing device is shown at 32, and 34 shows the device for removing material from the web 26 in response to the sensing device 32. Another pair of pulling rollers 36 is provided similar to those shown at 30 but slightly larger in diameter (approximately .002″) so that the tobacco web is maintained under proper tension while being gauged and corrected.

A pair of slitting rollers 38 is provided for shredding the web 26 into the desired form from which it passes onto the endless tape 40 which passes over the series of rollers as shown, being driven by the drum 42. The tape 40 is plowed up into a U formation by suitable guides as is conventionally done so that in conjunction with the wheel 44 the tobacco strands are moulded into a continuous rod of substantially circular cross section. FIG. 2 shows how the wheel 44 and the tape 40 cooperate to achieve this end.

The top guide 46 scrapes the wheel 44 to strip the tobacco therefrom and acts as a top guide which extends along band 40 to the end of its travel. Here, the tobacco is transferred onto the paper or other (e.g. reconstituted tobacco) web 54 of continuous indefinite length which is supported on the endless tape 48 driven by drum 50 after which it passes through conventional apparatus to form a continuous rod which is cut into discrete lengths by the cutoff mechanism 60. The conventional apparatus here employed comprises the tongue 52 which gathers and compresses the tobacco into a substantially circular cross section smaller than the finished cigarette so that the web 54 may be partially wrapped around it, leaving one edge projecting to gather adhesive from the wheel 56, after which the pasted edge is plowed into contact with the opposite edge in which form it passes under the heating mechanism 58 which dries the adhesive completing the rod.

It will be understood that those who do not desire to use the mass sensing device 32 and the controlled trimmer 34 would have need for only one pair of pulling rollers 36, the rollers 30 being unnecessary in this case.

An enlarged view showing details of one suitable form of trimmer is shown at FIG. 3. With this apparatus it is proposed to trim one edge of the moving tobacco web 26 varying the width of the amount trimmed in response to a signal initiated by the gauge 32.

An electric motor 62 has fastened to it an extension bracket 64 which supports the motor shaft 66 carrying at its extremity a circular knife 68. A second shaft 70 is supported in the bracket 64 which shaft carries knife 72 being driven by gears 74. The knives 68 and 72 are shaped and positioned relative to each other to efficiently shear the web 26 passing between them when the motor 62 is energized.

The motor 62 is provided with a suitable base 76 by which it is slidably supported. The screw 80 is provided, which may be rotated by means of the worm wheel 82 and worm 84 which may be driven in either direction by the reversible electric motor 86 to move the motor assembly 62 and 64 relative to the web 26.

The mass sensing device 32 generates an electric current which is proportional to the mass of the web 26 passing through it. The current is amplified and manipulated by known means (not shown) and fed into the motor 86, which by the means described, positions the knives 68 and 72 relative to the web 26 to remove the requisite amount of material from one edge, leaving the remainder of the web 26 with uniform mass per unit length, which results in the cigarettes produced being of uniform mass per unit lengths.

FIG. 4 shows a side view of one form of slitter which may be used at 38. It consists of two stacks of complementary shear knives through which the web 26 passes, slitting it into continuous axial strands. If desired, the second of pulling rolls 36 may be shaped to crimp the strands to any desired patterns. FIG. 11 shows one suitable arrangement 36′.

FIG. 5 shows an alternative web shredding mechanism 38′ which may be employed in position 38. This consists of an upper roller 88 on whose periphery is carried the desired pattern of V shaped cutting edges 90, 92, etc., which, in conjunction with the plain lower roller 94 comprises mechanism which is capable of "crush cutting" the web fed between the rolls. These rolls are driven in timed relationship with the remainder of the machine so that the desired pattern of cut strands may be repeatably provided in each cigarette produced.

It will be understood that the pattern arrangement of the knives carried on roller 88 is limitless, making possible any desired strand arrangement in the cigarette, for with the mechanism described, the cut strands will be transferred into the cigarette rod forming mechanism undisturbed, making possible full control of strand orientation in the finished article.

FIG. 6 shows a lateral pattern which may be left joined together by narrow longitudinal strands at intervals across the width, the example illustrated showing lateral strands at the edges only.

FIG. 7 shows a chevron pattern joined laterally at the edges and center.

FIGS. 8 and 9 show curved patterns and connections between the strands being left at any desired points, or it may be made with no connections at all, although some connections are desirable, to ensure that the strands are conveyed to the finished cigarette in a substantially unchanged position.

It will be understood by those versed in the art that various strand orientations will result in cigarettes of differing degrees of "firmness." For instance, if all the strands are arranged diametrically across the cigarette it will feel much harder and firmer than it would if the same weight of strands were arranged longitudinally. Alternatively, the longitudinal strands will provide a more stable cigarette end.

In order to obtain the advantages of both of these strand arrangements in a single cigarette, the tobacco web may be cut as shown in FIG. 10, the diametrical strands 96 being provided for the body of the cigarette while the longitudinal strands 98 are provided for the ends. The repeatable pitch of this arrangement will be equal to the finished cigarette lengths so that the ends will be cut on the lines 100, producing the desired result.

FIG. 12 shows yet another roller arrangement 38″ for position 39. Each roller is provided with a coacting V projection to run longitudinally along the web. These rolls will not be set closely together but will be set just far enough apart to cause each V projection to stretch the web causing incipient longitudinal tears which will be of a random nature.

FIG. 13 shows another groove arrangement, one of many which may be employed for rollers shown in FIGS. 11 and 12.

It is obvious that a smoking article may be made with tobacco in forms different from the shredded tobacco commonly employed in cigarettes, indeed some cigars have always been made from bunches of large pieces of tobacco leaves crumpled together into the desired shape and density.

FIG. 14 shows apparatus similar to that shown in FIG. 1 which is adapted for this class of work. The bobbin of tobacco sheet 20 is mounted as before, the tobacco web 26 passing through guide 28, being pulled from the bobbin 20 by means of pulling rollers 30.

If the mass sensing device is used, the sensing apparatus 32, the controlled slitting device 34 and the second pulling rolls 36 are provided after which the web passes through a trumpet shaped guide 102 which crumples the web and gathers it into a small compass prior to laying on the tape 40 where it is drawn into the apparatus to be formed into a finished rod exactly as described in relation to FIG. 1. It will be understood that the tobacco stream so formed will fit tightly in the U shape of tape 40 under wheel 44 so as to provide sufficient tension in the web to pull it through the trumpet 102.

In its simplest form, trumpet 102 may be similar to that shown in FIG. 15 consisting of a simple hollow cone configuration, the large end being adapted to receive the tobacco web, the small end being of suitable size to permit of reasonably free movement of the crimped web.

FIG. 16 shows an alternative 102' of a metal sheet bent to the desired shape, which may be altered to produce various results, folded over itself and also tapering from the large entrance end to the small exit end. The web of tobacco is threaded into the space between the surfaces of the plate so that the crimpling which will occur as it progresses from the large to the small end is under control.

FIG. 17 shows another arrangement 102" as an alternative for the trumpet 102 comprising two corrugated sheets of metal tapering from one end to the other. The tobacco sheet is passed through the space between the corrugations to control the crimpling which takes place as the web passes from the large to the small end.

FIG. 18 shows another alternative 102'" for 102 being the special case of a circular form of the apparatus shown in FIG. 16.

In addition to this longitudinal crimpling the web may be crimped by rollers of the general type shown in FIG. 11 or partially split by rollers of the general type shown in FIG. 12.

It will be noticed that part of the mechanism shown in FIGS. 1 and 14 which is to the left of the roller over which the web 54 enters the apparatus is quite separate from the apparatus to the right. It is therefore possible to drive these two separate portions of the mechanism at different speeds.

Thus, if the R.H. apparatus is driven faster than the L.H. apparatus the tobacco will be crowed together or shortened axially as it is transferred onto the web 54. By so employing different velocities the characteristics of the crimping of the tobacco in the finished articles may be adjusted and at the same time the mass per unit length of the cigarette may be changed in relation to the specific tobacco web whose mass per unit length may be less than that of the article produced.

By making a mass measurement of the finished article a signal may be obtained whereby the velocity of the R.H. apparatus may be varied relative to that of the L.H. apparatus in such a manner that the mass per unit length of the finished article may be maintained constant, in spit of variations existing in the mass per unit length of the tobacco web supplied.

Alternatively, a mass measurement of the web may be made at position 32, FIG. 1 and the correcting apparatus 34 may be omitted, the signal from the mass measurement changing the velocity of the R.H. apparatus in such a manner that the mass per unit length of the finished article is maintained constant in spit of variations in the mass per unit length of the web.

FIG. 19 shows an arrangement for a rod former for oval cigarettes which resembles FIG. 2 except that the cross section of the space between the wheel 44' and the depression into which the belt 40' is drawn is oval instead of circular.

Figure 20:
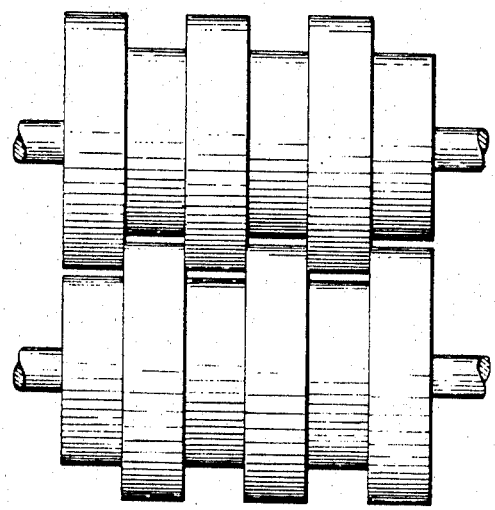
FIG. 20 shows a slitter for slitting shreds of a width different from that shredded by the shredder of FIG. 4.

FIG. 20 corresponds to FIG. 4 except that the peripheral projections and depressions are wider than in FIG. 4 to produce wider shreds. It is to be understood, of course, that the widths of the projections and depressions are exaggerated both in FIG. 4 and FIG. 5 when the shredder or slitters in these figures are employed for shredding or slitting tobacco. It is to be understood further that the dimensions of these projections and depressions may extend through a wide range as required for the particular application.

Figure 21:
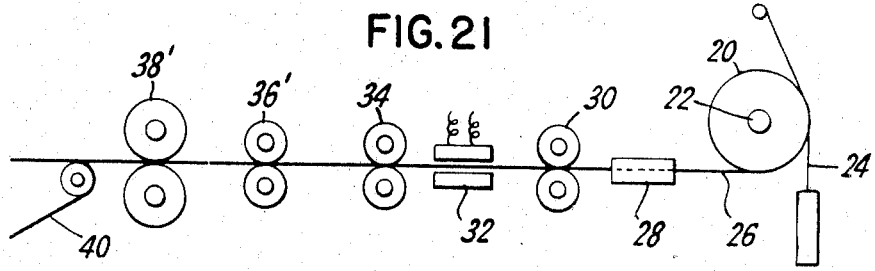
FIG. 21 shows an arrangement in which the web is crumpled before slitting.

FIG. 21 shows an arrangement in which the crimpers 36' are engaged before the slitters 38'.

Figure 22:
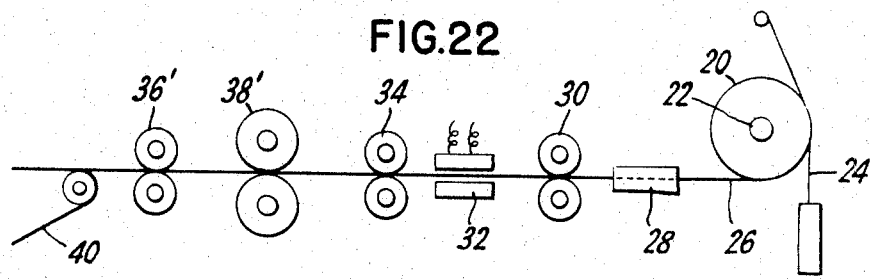
FIG. 22 shows an arrangement in which the web is slit before crumpling.

FIG. 22 shows an arrangement wherein the slitters 38' are engaged before the crimpers 36'.

Figure 23:
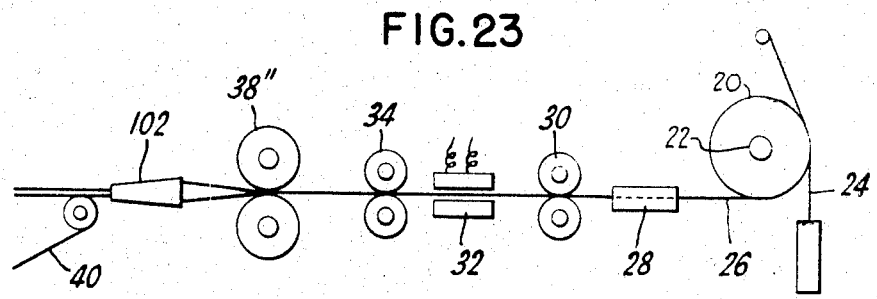
FIG. 23 shows an arrangement in which apparatus is disposed for the incipient tearing of the web.

FIG. 23 shows an arrangement wherein the incipient web tearers 38" of FIG. 12 are employed to engage the web prior to crumpling of the web in crumpler 102.

Figure 24:
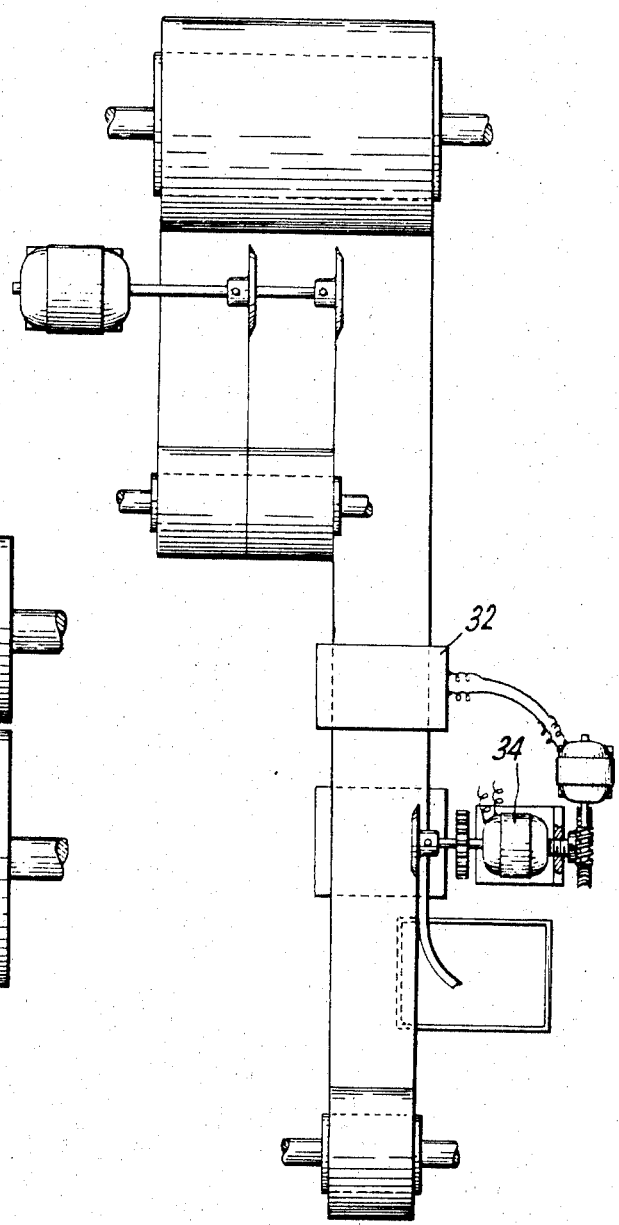
FIG. 24 shows an arrangement in which a web is slit from a larger web, excess material is removed from the slit web and it is wound into bobbin form.

FIG. 24 shows an arrangement wherein a wide web is slit into three individual webs, two of which are wound on reels while the third is passed through a mass sensing device 32 which measures the mass per unit length and responsively actuates the edge trimmers 34 of FIG. 3 which control the removal of the excess material. Thereafter, the material, which has been adjusted so that it is of uniform mass per unit length is wound on a reel. The trimmed material is diverted into a container. When this arrangement is used, the mass of the web per unit length always exceeds the standard so that it may be corrected by the removal of material therefrom. Obviously, with such an arrangement, it would not be possible to compensate if the material did not exceed the standard mass per unit length.

FIG. 25 shows an arrangement wherein a wide web of reconstituted tobacco is drawn off a reel by means of a pair of feed rollers. A transverse section extending throughout the entire width of the web is sensed to determine its mass per unit length and responsively to produce a voltage varying with the mass. The voltage is applied to slitting means which adjusts the position of slitting knives so as to produce a plurality of web strips of uniform mass per unit of length. The strips are, in turn, passed through guiding, or web centering, devices and then into cigarette rod formers.

FIG. 26 shows an arrangement wherein a tobacco web is drawn from a supply reel through a guiding device 28 by means of a pair of coacting feed rollers 30. The web is passed through a sensing device 32 which responsively produces a voltage which is applied to a material removing device 34 such as is shown in FIG. 3. The web then passes through a shredder 38 such as is shown in FIG. 4, for instance, and then through a crumper 36' such as is shown in FIG. 11. It then passes onto a crumped shred remover feed belt 40 and between feed rollers 42, such as is shown in FIG. 1. There is also shown in FIG. 26 a means for removing the crimped tobacco shreds at a slower rate than that at which reconstituted tobacco is fed from the supply reel. This is performed by feeding electric energy from a power source through a switch directly to a motor which drives the pair of coacting feed rollers at a higher speed and indirectly through a pair of resistors to a second motor which removes the crimped shred at a slower speed. It is assumed that the motors have identical characteristics and that the speed of the lower motor in the figure will be slower because of the lower voltage applied to it as a result of the resistors in series with its supply line.

Figure 27:
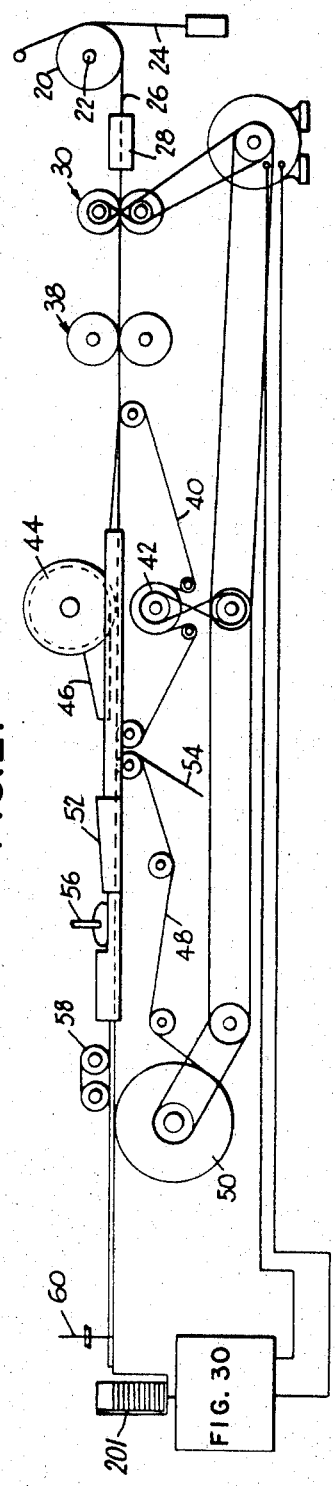
FIG. 27 shows an arrangement for making a mass measurement of the finished article to control the velocity of the right-hand portion of the apparatus relative to the left-hand portion to maintain the mass per unit length of the finished article constant.
Figure 30:
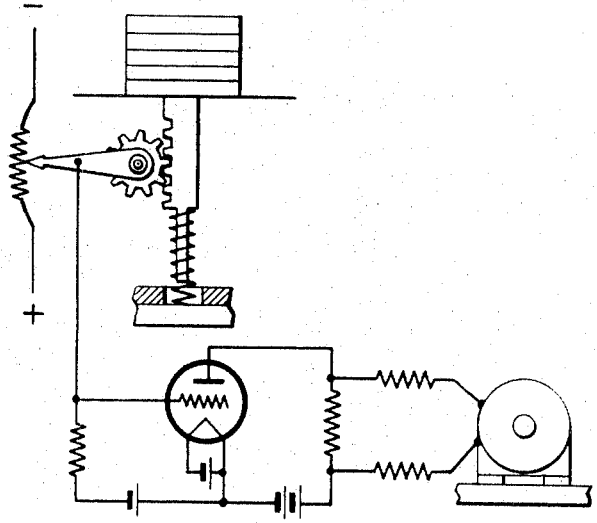
FIG. 30 is an arrangement for detecting the mass of the finished article or the mass of the web, producing a voltage responsive to said measurement and varying the speed of a motor responsive to said variations in voltage.

FIG. 27 largely resemblies FIG. 1 except that its output is equipped with a means for measuring the mass of a predetermined quantity of cigarettes which are accumulated regularly from the output of the cutoff mechanism 60. The predetermined quantity of cigarettes is accumulated in container 201. Any of a number of well known mechanisms may be employed to produce a voltage varying with the mass of the predetermined quantity of cigarettes in the container 201. One such mechanism is shown in FIG. 30, for instance. In this figure, the varying mass controls a scale spring which, in turn, controls the position of a contact on a potentiometer connected between positive and negative batteries. This, in turn, regulates the voltage between the grid and cathode of a vacuum tube or similar space charge device which varies the current flow through a resistor in the output circuit of the vacuum tube. Taps are taken off the extremities of the output resistor thus applying a variable voltage to a variable speed motor, which voltage varies with the variations in the mass of the cigarettes accumulated in the container 201. The variable speed motor is shown in FIG. 27 coupled to the web feed rollers 30 by means of continuous belts.

Figure 28:
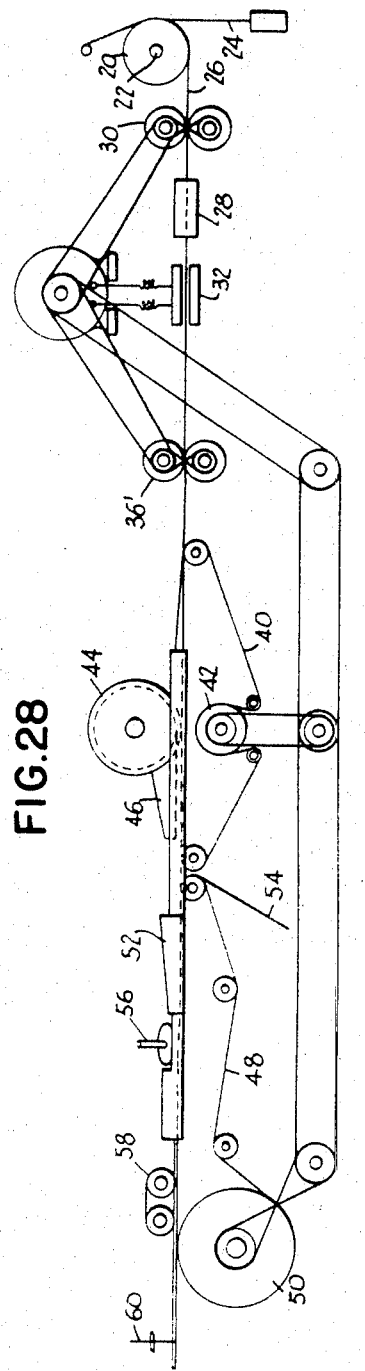
FIG. 28 shows an arrangement for drawing a tobacco web from a source of supply, sensing the mass of the web, cirmping the web, changing the velocity of the drawing and crimping apparatus, responsive to the sensing, forming a rod from a crimped web and forming a cigarette from the rod.

FIG. 28 shows an arrangement wherein the mass measuring device 32 controls a variable speed motor which, in turn, controls the speed of operation of crimpers such as 36¹ of FIG. 11 and of the feed rollers 30.

Figure 29:
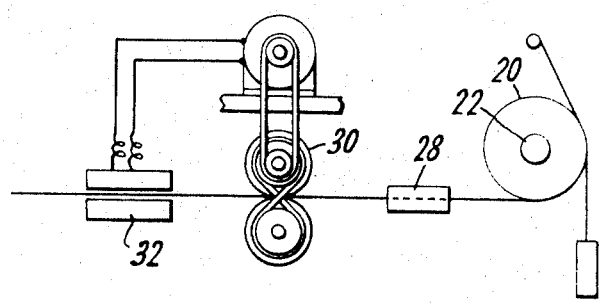
FIG. 29 shows an arrangement for drawing a tobacco web from a source of supply, sensing the mass of the web and changing the velocity of the right-hand apparatus responsive to the mass measurement to maintain the mass per unit length of the finished article constant.

FIG. 29 shows an arrangement wherein a sensing device 32 senses the mass of a unit length of the web, generates a voltage which varies with the unit mass of the web and responsively controls the speed of a variable speed motor. The variable speed motor, in turn, controls the speed of rotation of feed rollers which draw the web from the reel.

FIG. 30 shows an arrangement in which a supply of web material is drawn off a reel by coacting feed rollers 30, and is directed through slitting rollers 38 and a sensing device. Variations in the material produce a variation in the voltage which is applied to the motor which drives the feed rollers 30, changing their speed.

Figure 31:
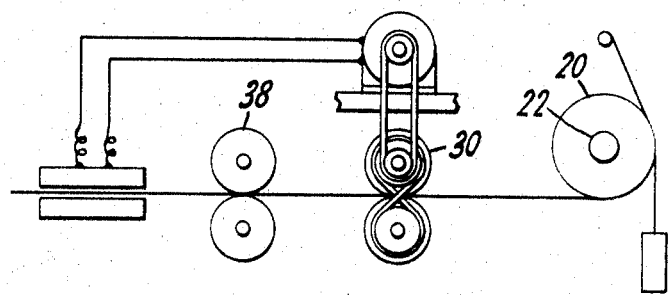
FIG. 31 shows an arrangement for drawing a tobacco web from a source of supply, a slitter for slitting the web, a senser for sensing the mass of the web and means for controlling the speed of the web feed motor drive responsive to the sensing.

FIG. 31 is a perspective view of the finished article with the wrapper broken away to show the filler.

The invention being described above may be varied in construction, for the variations of the device selected to illustrate the invention are only a few of the many possible embodiments of the same. Also various combinations of the different mechanisms may be employed according to the particular end result required. The invention, therefore, is not to be restricted to the precise details of the structures shown and described.

What is claimed is:

1. A continuous method of making a smoking article from reconstituted tobacco, comprising the steps of supplying said tobacco as a substantially endless web having a mass per unit length substantially equal to that of the desired smoking article, feeding said web at a predetermined speed along a predetermined route of travel, working said web as it travels to modify its structure transverse its length, said working being accomplished by cutting said web into a multiplicity of strands, said cutting being discontinuous to ensure that the web remains coherent, forming said worked web as it continues its travel into a continuous uniformly shaped moving rod having an irregular interior transverse its length and a mass per unit length substantially equal to that of said web, applying a wrapping to said moving rod, and cutting said rod into distinct cigarette or cigar length smoking articles.

2. The method according to claim 1 wherein said cutting is effected along an axis substantially transverse to the length of said web.

3. The method according to claim 1 wherein said cutting is effected along an axis substantially parallel to the length of said web.

4. The method according to claim 1 wherein said cutting is effected along an axis substantially diagonal to the length of the web.

5. Apparatus for continuously making smoking articles from reconstituted tobacco, comprising means for supplying said tobacco in an endless web having a mass per unit length substantially equal to that of the desired smoking product, feed means for moving said web at a predetermined speed along a predetermined path, means for physically working said moving web so as to modify its structure transverse to its length, said means for working including a cutting mechanism for cutting said web in selected portions thereof, said cutting mechanism being arranged to form discontinuous cuts to ensure that the web remains coherent, forming means for connecting said worked web as it continues to move into a uniformly shaped moving rod having an irregular interior transverse its length, and means for wrapping said moving rod and cutting said rod into distinct cigarette or cigar length smoking articles.

6. The apparatus according to claim 5 including means for controlling the working of said web in repetitive patterned cycles.

7. A continuous method of making a smoking article from reconstituted tobacco comprising the steps of supplying said tobacco in a substantially endless sheet, feeding said sheet at a predetermined speed along a predetermined route of travel, shredding said moving sheet as it travels into distinct strands, said shredding being discontinuous to ensure that the web remains coherent, orienting said moving strands to form a stream thereof having a mass per unit length equal to that of the desired smoking article, applying a wrapper to said moving stream to form a moving rod thereof and cutting said rod into distinct cigarette or cigar length smoking articles.

8. Apparatus for continuously forming smoking articles from a supply of reconstituted tobacco in the form of a substantially endless web, comprising means for feeding said web along a predetermined path of travel, cutting means for converting said web into a plurality of strands, said cutting means being arranged to form discontinuous cuts to ensure that the web remains coherent, means for orienting said strands into a stream having a predetermined shape and a uniform mass per unit length and means for converting said stream into finished cigarette or cigar length smoking articles.

9. The mechanism according to claim 8 including means for orienting said strands in predetermined controlled repetitive patterns.

10. A continuous method of making a smoking article from reconstituted tobacco, comprising the steps of supplying said tobacco as a substantially endless web having a mass per unit length substantially equal to that of the desired smoking article, feeding said web at a predetermined speed along a predetermined route of travel, working said web as it travels to modify its structure transverse its length in uniform repeated patterns related to the length of the desired smoking article whereby the body of said smoking article will have a web portion worked in one manner and the ends of said smoking article have web portions worked in another manner, forming said worked web as it continues its travel into a continuous uniformly shaped moving rod having an irregular interior transverse its length and a mass per unit length substantially equal to that of said web, applying a wrapping to said moving rod, and cutting said rod into distinct smoking articles.

11. A continuous method of making a smoking article from reconstituted tobacco comprising the steps of supplying said tobacco in a substantially endless sheet, feeding said sheet at a predetermined speed along a predetermined route of travel, shredding said moving sheet as it travels into distinct strands, orienting said moving strands to form a stream thereof in a controlled pattern having one pattern for the body of said smoking article and another pattern for the ends thereof, having a mass per unit length equal to that of the desired smoking article, applying a wrapper to said moving stream to form a moving rod thereof and cutting said rod into distinct smoking articles.

(References on following page)

References Cited

UNITED STATES PATENTS

| | | |
|---|---|---|
| 1,949,654 | 3/1934 | Norris. |
| 2,164,702 | 7/1939 | Davidson. |
| 2,592,554 | 4/1952 | Frankenburg. |
| 2,707,472 | 5/1955 | Jurgensen et al. |
| 2,849,932 | 9/1958 | Marogg. |
| 2,934,073 | 4/1960 | Killian _____ 131—8 X |
| 3,084,697 | 4/1963 | Eissmann. |

FOREIGN PATENTS

| | | |
|---|---|---|
| 354,134 | 6/1922 | Germany. |
| 440,484 | 1/1936 | Great Britain. |

SAMUEL KOREN, Primary Examiner

U.S. Cl. X.R.

131—64, 84